United States Patent Office 3,147,245
Patented Sept. 1, 1964

3,147,245
PHARMACEUTICAL PURIFICATION PROCESS
Robert Kunin, Yardley, Pa., assignor to Rohm & Haas Company, Philadelphia, Pa., a corporation of Delaware
No Drawing. Filed Feb. 3, 1961, Ser. No. 86,856
11 Claims. (Cl. 260—210)

This invention concerns ion exchange processes for the purification of organic compounds. More particularly, it concerns a process for the treatment of aqueous solutions of basic high molecular weight pharmaceutical compounds which are adsorbable on carboxylic cation exchangers. More specifically, it concerns a process for reducing the ash or inorganic salt content of aqueous solutions of such pharmaceutical compounds and makes it possible to obtain purer more concentrated solutions of such pharmaceutical compounds.

The use of cation exchange resins, more particularly carboxylic cation exchangers, for the purification of pharmaceutical compounds, such as streptomycin and other similar antibiotics, is well known in the prior art and such processes have been adopted on a world-wide basis. For such purification processes, sulfonic acid cation exchangers are much less suitable since, although they adsorb the antibiotic or other pharmaceutical compound from the dilute aqueous solution, the resins adsorb the pharmaceutical compound so tenaciously that very large volumes of eluting solutions are required to flush it off the resin. In some cases, the eluate is actually more dilute than the original solution before treatment with the sulfonic acid cation exchanger.

One of the widely used processes for the isolation and purification of pharmaceutical compounds such as streptomycin comprises contacting a filtered solution of the crude antibiotic, or a clarified fermentation broth, with a carboxylic cation exchanger in the sodium or ammonium form. This process is disclosed in detail in U.S. 2,541,420 and the information therein is incorporated herein by reference. Because of the large size of the antibiotic molecule, however, all of the sodium or ammonium ions on the exchanger cannot be replaced by antibiotic molecules and so the sodium or ammonium ions remain on the exchanger as sodium or ammonium ions, or are replaced by other inorganic ions present in the crude solution. The antibiotic is recovered from the cation exchanger by treating the exchanger with a dilute aqueous solution of a mineral acid, such as hydrochloric. During the elution of the antibiotic, however, the inorganic cations, including sodium and ammonium, adsorbed on the exchanger are also eluted, thus giving rise to a solution of the antibiotic which, while appreciably purer than the original solution, is still contaminated with inorganic cations. Thus, in order to obtain the antibiotic in pure form, further processing following the adsorption on the cation exchanger is necessary. Typical of such purification steps are recrystallization as double salts, treatment with special mixtures of cation and anion exchangers, etc. The details of such additional purification steps are well-known to those skilled in the art.

It has now been found that the need for these laborious and time-consuming additional purification processes can be minimized or completely eliminated by the use of a stepwise elution process, which process effectively first elutes the sodium, ammonium and other inorganic ions adsorbed on the cation exchanger without eluting any of the pharmaceutical compounds adsorbed thereon. Following the removal of the inorganic "ash" ions, the pharmaceutical compound can then be eluted to give pure concentrated solutions of the compound.

The basic steps in the process of the present invention are:

(1) Treatment of an impure aqueous solution of a pharmaceutical compound by contacting said aqueous solution with a carboxylic cation exchange resin in the sodium form or ammonium form until the exchanger has become saturated with the pharmaceutical compound;

(2) Elution of the inorganic cations from cation exchange resin by treatment of the exchanger with an aqueous solution of carbon dioxide;

(3) Elution of the pharmaceutical compound from the cation exchanger with an aqueous solution of a mineral acid;

(4) Recovery of the substantially pure pharmaceutical compound from the aqueous solution of the mineral acid, and (5) Conversion of the cation exchanger to the sodium or ammonium form by treatment of the cation exchanger with an aqueous solution of an alkaline sodium or ammonium salt or sodium or ammonium hydroxide.

Alkaline salts of potassium, lithium or even cesium or the corresponding hydroxides may also be employed for the conversion of the hydrogen form of the carboxylic cation exchanger in the process of the present invention, but, from an economic standpoint, the sodium or ammonium salts or hydroxides are preferred. Suitable rinsing steps, familiar to those skilled in ion exchange, are employed as set forth hereinafter.

The preferred classes of weakly acidic cation exchangers used in the process of the present invention are those in which the cation exchange activity is due to the presence of carboxylic acid groups in the molecule. Such resins are well-known and commercially available and the preparation of resins of this type is set forth in detail in U.S. Patent Nos. 2,319,359; 2,333,754; 2,340,110; and 2,340,111. The information therein is incorporated herein by reference. One particularly preferred carboxylic resin is prepared by suspension copolymerizing a mixture of methacrylic acid and divinylbenzene using about 3 to 10% divinylbenzene. This type of resin is commercially available as Amberlite IRC-50 from Rohm & Haas Company, Philadelphia, Pennsylvania. Another preferred carboxylic exchanger is prepared by copolymerizing methyl or ethyl acrylate with divinylbenzene and subsequently hydrolyzing the copolymer to produce carboxylic groups.

The pharmaceutical compounds amenable to purification by the process of the present invention have several common characteristics. They all contain at least one basic nitrogen-containing group and they are all relatively high molecular weight compounds. Another property common to all of them is the fact that their acid salts, more specifically the salts of the compounds with low molecular weight acids such as hydrochloric, hydrobromic, hydroiodic, nitric, sulfuric, phosphoric, citric, lactic, tartaric, and acetic aids, are water-soluble.

The moleular weight range of the compounds suitable for use in the process of the present invention will vary somewhat depending on the chemical composition and molecular configuration of the particular compound involved. In general, however, the molecular weights will be in the range of 250 to 2000.

The minimum basic strength which the compound must possess will vary, but if the compound contains a basic N-containing group, it will be adsorbed by carboxylic cation exchanger. The minimum basic strength required will also vary somewhat with the particular carboxylic cation exchanger being used. Thus, the acid strength of carboxylic cation exchangers will vary depending on the composition of the exchanger. Thus, the carboxylic cation exchanger derived from acrylic acid or derivatives have higher acid strengths than the corresponding methacrylates.

Typical of the pharmaceutical compounds suitable for use in the process of the present invention are the following.

I. Antibiotics:                 Molecular weight
- Streptomycin                 581.6
- Neomycin
- Kanamycin                   484.5
- Tetracycline                 444.4
- Oxytetracycline
- Terramycin                   496.5
- Oleandomycin               529
- Erythromycin               733.9
- Bacitracin                   Ca. 1400
- Polymyxins                   Ca. 1500

II. Alkaloids:
- (1) Optimum group—
  - (a) Morphine             285
  - (b) Codeine              299
  - (c) Noscapine           413
  - (d) Papaverine          339
  - (e) Thebaine            311
- (2) Belladona group—
  - (a) Atropine             289
  - (b) Scopolamine        303
- (3) Miscellaneous alkaloids—
  - (a) Ergotamine          582
  - (b) Quinine              324
  - (c) Procaine             236

III. Hormones:
- (1) Relaxin                   >1500
- (2) Reserpine                609

Thus, it can be seen that at a large number of chemically different compounds are amenable to purification by the process of the present invention.

Aqueous solutions of carbon dioxide for use in the present invention can be prepared by bubbling gaseous carbon dioxide into distilled or deionized water. Suitable solutions can also be prepared by mixing solid carbon dioxide with distilled or deionized water. The temperature at which the elution is effected is not critical, but since the solubility of carbon dioxide in water decreases with increasing temperature, elution temperatures in the range of 15° to 35° C. and more particularly in the range of 20° to 30° C. are preferred. Normal "room temperatures" are generally in the range of 20° to 30° C.

The aqueous solutions of $CO_2$ can be used at atmospheric pressure and satisfactory elution of the inorganic cations will be obtained. However, faster more efficient elutions can be obtained if the $CO_2$ solution is under a positive pressure of $CO_2$. No advantage has been noted, however, in employing $CO_2$ pressures in excess of 10 atmospheres.

The process of the present invention can be batch, semi-continuous or continuous, with the preferred method being the semi-continuous method. In operating such a semi-continuous process, the carboxylic cation exchange resin is charged to a column and backwashed with water or dilute mineral acid to remove any fines or other unwanted impurities. The resin is then converted to the sodium or ammonium form by regenerating with a dilute aqueous solution of an alkaline sodium or ammonium salt, or sodium or ammonium hydroxide. Any remaining regenerant is rinsed with deionized water. The solution of the pharmaceutical compound is then fed to the column downflow or upflow and the breakthrough or leakage of the pharmaceutical compound determined by periodically testing the effluent. Any residual pharmaceutical compound in the column is rinsed therefrom with deionized water, and an aqueous solution of $CO_2$ is then passed downwardly or upwardly through the bed. When all the inorganic ions have been eluted, the bed is rinsed with deionized water and a dilute solution of hydrochloric acid is passed through the bed to elute the pharmaceutical compound. After rinsing, the exchanger is converted to the sodium or ammonium form by treatment with dilute caustic or ammonium hydroxide solution.

More highly concentrated solutions of the pharmaceutical compounds can be obtained by employing two or more beds of carboxylic exchanger in series. With such a system, the first bed can be saturated with pharmaceutical compound rather than just loading to breakthrough. The leakage of the pharmaceutical compound from the first bed after breakthrough and before saturation is adsorbed by the second bed of carboxylic cation exchanger in series with the first. The regeneration and rinse procedures are the same as for the one bed system.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

*Example I*

Twenty-five mls. of Amberlite IRC–50 $Na^+$ (wet), as hereinbefore described, was charged to a 50 ml. graduated burette and loaded at a 2 gal./cu. ft./min. flow rate with the antibiotic (or alkaloid) salt (4 g./liter). Loading was complete when two drops of effluent yielded a precipitate with one drop of phosphotungstic acid (0.2 g./10 mls.). The bed was then rinsed with two bed volumes of deionized water to remove excess salt. Twenty-five bed volumes of $CO_2$-water, made by adding Dry Ice to deionized water, was passed through the bed at a 2 gal. flow, each bed volume being checked for antibiotic leakage and alkalinity. Following a water rinse, the bed was eluted with 4% HCl to remove the antibiotic. After rinsing, the bed was reconverted to the sodium form by treatment with a 4% solution of NaOH. The results are shown in Table I:

TABLE I

| Antibiotic Salt | Grams of Antibiotic Loaded on Resin | Grams of Na Eluted With $CO_2$—$H_2O$ | Streptomycin Eluted With $CO_2$ | Ash Content of Eluate, percent | |
|---|---|---|---|---|---|
| | | | | Without $CO_2$ Elution | With $CO_2$ Elution |
| Streptomycin Sulfate | 5.6 | 0.51 | nil | 8.4 | <1 |
| Neomycin Sulfate | 2.2 | 0.64 | nil | 22.5 | <1 |
| Quinine Sulfate | 2.2 | 0.61 | nil | 21.5 | <1 |

As is clearly evident from the data in Table I, none of the compounds tested showed any elution during the treatment with the carbon dioxide solution. However, as shown by the "ash" content values in the last two columns, complete elimination of the ash was effected by the $CO_2$ elution.

*Example II*

Two columns each containing 20 grams of Amberlite IRC–50 were converted to the sodium form by passing 500 ml. of 8% aqueous sodium hydroxide through each column and then rinsing with 1000 ml. of water. Twenty-five liters of a clarified and neutralized streptomycin fermentation broth was passed through each column. One column (A) was rinsed with 500 ml. of water and then with 1000 ml. of water saturated with $CO_2$ under a pressure of 5 atmospheres. The other column (B) was rinsed with 500 ml. of water only. Both columns were then eluted by passing 400 ml. of 1.0 N aqueous HCl through each column. The eluates of each column were evaporated to dryness in vacuo at 25° C. and assayed. The streptomycin residue from column (A) was 99% pure, whereas the product from column (B) was but 80% pure.

*Example III*

Using a process as set forth in Example II, a hydrolyzed methyl acrylate-divinylbenzene copolymer containing 6% divinylbenzene was employed as the cation exchanger. Comparable results were obtained.

I claim:

1. In a process for concentrating and purifying organic compounds selected from the group consisting of organic compounds containing basic nitrogen-containing groups which form water-soluble salts with low molecular weight acids and have molecular weights in the range of 250 to 2000 by adsorption of the organic compound on a carboxylic cation exchanger from an aqueous solution thereof, the improvement which comprises eluting the remaining inorganic cations from the depleted salt form of the carboxylic cation exchanger, said salt form being selected from the sodium and ammonium salts of the carboxylic cation exchanger, on which the organic compound is adsorbed by treating the exchanger with an aqueous solution of carbon dioxide, eluting the substantially pure organic compound from the cation exchanger with a solution of a mineral acid.

2. A process as set forth in claim 1 in which the organic compound is streptomycin.

3. A process as set forth in claim 1 in which the organic compound is neomycin.

4. A process as set forth in claim 1 in which the organic compound is quinine.

5. A process as set forth in claim 1 in which the carboxylic cation exchanger is a copolymer of methacrylic acid and 3 to 10% divinylbenzene.

6. A process as set forth in claim 1 in which the carboxylic cation exchanger is a hydrolyzed copolymer of a lower alkyl acrylate selected from the group consisting of methyl acrylate and ethyl acrylate and divinylbenzene.

7. A process as set forth in claim 1 in which the carbon dioxide is under a carbon dioxide pressure of from 1 to 10 atmospheres.

8. A process as set forth in claim 1 in which the acid is an acid selected from the group consisting of hydrochloric, sulfuric, nitric and phosphoric acids.

9. A process as set forth in claim 8 in which the acid is hydrochloric acid.

10. A process as set forth in claim 1 in which the organic compound is adsorbed on the sodium form of a carboxylic cation exchanger.

11. A process as set forth in claim 1 in which the organic compound is adsorbed on the ammonium form of a carboxylic cation exchanger.

References Cited in the file of this patent

UNITED STATES PATENTS 2,793,978   Wachtel et al. _____ May 28, 1957

FOREIGN PATENTS 793,491   Great Britain _____ Apr. 16, 1958